J. C. BRIAN.
PORTABLE TRACK.
APPLICATION FILED DEC. 13, 1921.

1,410,055. Patented Mar. 21, 1922.

WITNESSES

INVENTOR.
J. C. Brian,
BY
ATTORNEYS

UNITED STATES PATENT OFFICE.

JAMES C. BRIAN, OF MINNEAPOLIS, MINNESOTA.

PORTABLE TRACK.

1,410,055. Specification of Letters Patent. Patented Mar. 21, 1922.

Application filed December 13, 1921. Serial No. 522,095.

*To all whom it may concern:*

Be it known that I, JAMES C. BRIAN, a citizen of the United States, and a resident of Minneapolis, in the county of Hennepin and State of Minnesota, have invented certain new and useful Improvements in Portable Tracks, of which the following is a specification.

The present invention relates to an improvement in portable tracks for use with vehicles, such as automobiles, motor trucks or the like.

One of the principle objects of the invention is to provide a portable track of this character which is adapted for use in extricating automobiles, motor vehicles or similar machines from a mud hole, snow bank or the like, and which utilizes the power of the vehicle in order to propery position the portable track beneath the wheel thereby obviating the necessity of excavating around the wheel in order to produce a track thereunder, and which when disposed beneath the wheel is firmly anchored thereunder and provides for the requisite traction to enable the automobile, motor truck or the like to carry itself out of the mud hole or snow bank as the case may be.

Another object is to provide a device of this character which is of simple and durable construction, reliable and efficient in operation and easy and comparatively inexpensive to manufacture.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1:
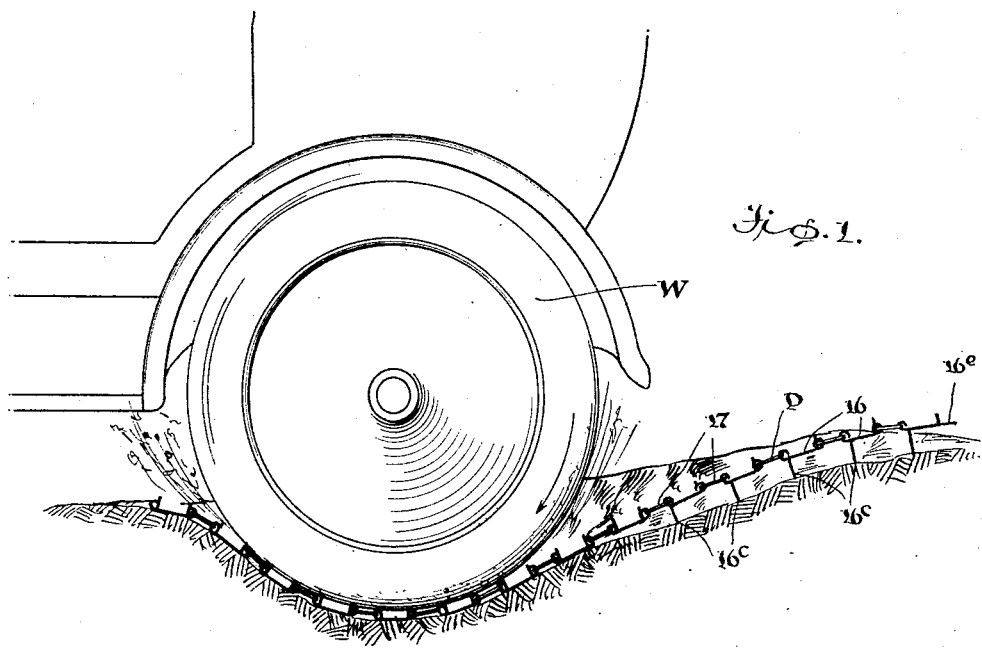
Figure 1 is a view in elevation, illustrating the preferred embodiment of the invention in use.
Figure 2:
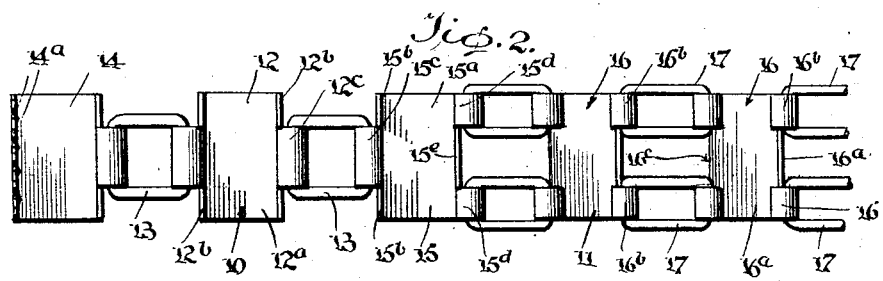
Figure 2 is a fragmentary plan view of the invention.

Referring to the drawings wherein for the sake of illustration is shown the preferred embodiment of the invention, the letter P designates the portable track which constitutes the present invention and which is adapted to cooperate with the driving wheel W of an automobile, motor truck or similar vehicle to provide the requisite traction for the driving wheel and enable it to carry the driving wheel out of the mud hole, snow bank or the like.

Figure 3:
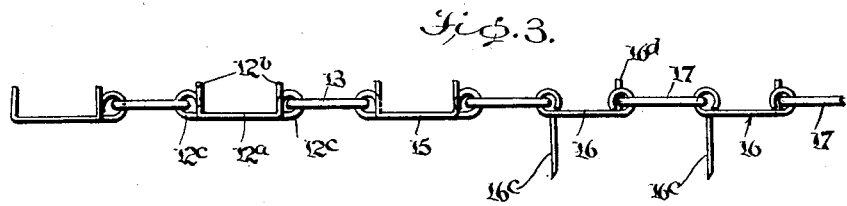
Figure 3 is a similar view in side elevation.

The portable track comprises in general two sections, designated at 10 and 11, respectively. The section 10 is made up of a plurality or series of traction links 12, each of which is constructed of a single piece of resilient sheet metal bent to provide a smooth bottomed body portion $12^a$, upstanding traction lugs $12^b$ which engage the wheel and constitute anti-slipping devices as between the wheel and this section of the track and pivot ears $12^c$ formed from the blank of metal intermediate the lugs $12^b$ and arranged centrally of the link. Connecting links 13 coact with the pivot ears $12^c$ of the traction links 12 to pivotally connect these traction links to each other. The connecting links 13 are each constructed of a single piece of resilient wire and there is one such link 13 between adjacent traction links. As shown in Figure 3, the pivot ears $12^c$, as well as the lugs $12^b$ are upturned or upstand from the body portion $12^a$ of the traction link and in this manner the connecting links 13 are arranged above the smooth bottom of the traction links and below the top of the anti-slipping lugs or traction lugs $12^b$. At the free end of the section 10 a claw link 14 is provided and is connected to the traction links of the section by one of the connecting links 13 after the same manner in which the other links of the chain are conected to each other. At the free end of the link instead of having the traction lugs and the pivot ears a plurality of upstanding teeth or claws, designated at $14^a$ are provided and are adapted to coact with the wheel in a manner to be hereinafter more fully described.

The section 11 of the track is connected with the section 10 by means of an intermediate traction link 15 which is constructed slightly different from either the traction links 12 or the traction links of the section 11 to be presently described. This intermediate link 15 includes a body portion $15^a$ and traction lug $15^b$ and a pivot ear $15^c$ of construction identical with the corresponding elements of any of the traction links 12, and the bearing or pivot ear $15^c$ coacts with one of the connecting links 13. This intermediate link 15 also includes a pair of pivot ears $15^d$ between which another traction lug $15^e$ is arranged.

The section 11 comprises a plurality of traction links 16 connected to each other by pairs of connecting links, designated at 17. The traction links 16 are constructed of a single piece of sheet metal and each includes a body 16ª having pairs of pivot ears 16ᵇ formed therefrom and provided with a depending and ground engaging spur 16ᶜ and an upstanding anti-slipping or traction lug 16ᵈ. The end link 16 preferably has only one pair of pivot ears 16ᵇ (see Figure 1), the metal at the opposite end being flattened out, as at 16ᵉ.

In using the track for extricating automobiles, motor vehicles or the like from the mud hole or snow bank, the claw link 14 has its teeth or claws 14ª engaged with the wheel W and the track itself is alined with the wheel. Then when the wheel is turned or driven backwardly the engagement thereof with the claw link operates to carry the section 10 completely around under the wheel and to bring the section 11 beneath the wheel. The traction links 12 of the section 10 slide freely around under the wheel since their bottom surfaces are formed smooth and as the connecting links 13 are arranged above these bottom surfaces they also do not offer any resistance to this movement. The lugs 12ᵇ however of the links operate as anti-slipping or friction devices as between the section 10 of the track and the automobile wheel. As the section 11 of the track comes beneath the wheel and the weight of the vehicle operates on the link 16 of this section it forces the ground engaging spurs 16ᶜ of these traction links firmly into the ground which anchor the track. Then as the wheel continues to rotate there is provided adequate traction therefor so that it can and does operate to carry the vehicle over the portable track and out of the mud hole.

I claim:

1. A portable track for vehicles including a section comprising traction links having smooth bottoms engageable with the ground and connecting links between said traction links, and a section comprising traction links having spurs engageable with the ground and connecting links between said last mentioned traction links.

2. A portable track for vehicles including a section comprising links having substantially smooth bottoms and a section comprising links having spurs engageable with the ground.

3. A portable track for vehicles including a claw link cooperable with the wheel for carrying the track beneath the same and traction links having spurs engageable with the ground to anchor the portable track beneath the wheel.

4. A portable track for vehicles including a section comprising traction links having smooth bottoms and provided with anti-slipping means engageable with the wheel, connecting links between said traction links and a claw link at the end of said section, and a section comprising traction links having spurs engageable with the ground and pairs of connecting links between said last mentioned traction links.

5. A portable track for vehicles consisting of a plurality of traction links constructed of sheet metal and connecting links between the traction links constructed of wire and pivotally connected to the traction links.

6. A portable track including traction links constructed of sheet metal having a body portion, upstanding traction lugs and pivot ears, and connecting links cooperating with the pivot ears.

JAMES C. BRIAN.